United States Patent
Volach

(10) Patent No.: US 9,450,899 B2
(45) Date of Patent: Sep. 20, 2016

(54) SYSTEMS AND METHODS FOR MESSAGING AND PRESENCE MODIFICATION

(76) Inventor: Ben Volach, Haifa (IL)

( * ) Notice: Subject to any disclaimer, the term of this patent is extended or adjusted under 35 U.S.C. 154(b) by 534 days.

(21) Appl. No.: 13/821,032

(22) PCT Filed: Dec. 12, 2011

(86) PCT No.: PCT/IB2011/055603
§ 371 (c)(1),
(2), (4) Date: Jun. 7, 2013

(87) PCT Pub. No.: WO2012/080930
PCT Pub. Date: Jun. 21, 2012

(65) Prior Publication Data
US 2013/0304831 A1 Nov. 14, 2013

Related U.S. Application Data

(60) Provisional application No. 61/422,188, filed on Dec. 12, 2010, provisional application No. 61/442,180, filed on Feb. 12, 2011.

(51) Int. Cl.
*G06F 15/16* (2006.01)
*H04L 12/58* (2006.01)
*H04L 29/08* (2006.01)

(52) U.S. Cl.
CPC .......... *H04L 51/046* (2013.01); *H04L 51/066* (2013.01); *H04L 67/24* (2013.01)

(58) Field of Classification Search
None
See application file for complete search history.

(56) References Cited

U.S. PATENT DOCUMENTS

| 6,119,137 A | 9/2000 | Smith et al. |
| 6,529,942 B1 | 3/2003 | Gilbert |
| 6,707,890 B1 | 3/2004 | Gao et al. |
| 7,010,757 B2 | 3/2006 | Stana et al. |

(Continued)

FOREIGN PATENT DOCUMENTS

| DE | 102005042068 A1 | 3/2007 |
| EP | 1646001 A1 | 4/2006 |

(Continued)

OTHER PUBLICATIONS

RFC 2045, RFC 2046, RFC 2047, RFC 4288, RFC 4289 RFC 2049 and RFC 2388; RFC 2778, RFC 2779, RFC 3761, RFC 3762, RFC 3764, RFC 4725, RFC 3920, RFC 3921, RFC 3922, RFC 3923, RFC 4854, RFC 4974, RFC 5122, RFC 3428, RFC 3856, RFC 3857, RFC 3858 and RFC 4825 available from the Internet Engineering Task Force (IETF) at http://tools.ietf.org/html/.

(Continued)

*Primary Examiner* — John B Walsh
(74) *Attorney, Agent, or Firm* — Mark David Torche; Patwrite LLC

(57) ABSTRACT

Electronic message modifying systems and methods are described; system includes a sending terminal, at least one modification parameters database, which contains a plurality of modification parameters, at least one message modification agent and a recipient moiety, including a message user agent, where the modification parameters in the database are updated dynamically; the method includes sending a message, obtaining at least one modification parameter, from a database which contains a plurality of modification parameters, applying to the message at least one modification parameter by a message modification agent and delivering a modified message to the recipient.

86 Claims, 3 Drawing Sheets

(56) References Cited

U.S. PATENT DOCUMENTS

| | | | |
|---|---|---|---|
| 7,030,730 B1 * | 4/2006 | Zondervan | G06Q 10/107 340/7.1 |
| 7,392,289 B2 | 6/2008 | Curry et al. | |
| 2002/0010798 A1 | 1/2002 | Ben-Shaul et al. | |
| 2002/0016818 A1 | 2/2002 | Kirani et al. | |
| 2002/0120600 A1 | 8/2002 | Schiavone et al. | |
| 2002/0147778 A1 | 10/2002 | Dutta | |
| 2003/0065729 A1 | 4/2003 | Leinonen | |
| 2003/0123104 A1 | 7/2003 | Sasakuma et al. | |
| 2005/0136908 A1 | 6/2005 | Shell et al. | |
| 2005/0159135 A1 | 7/2005 | Kim | |
| 2005/0198173 A1 | 9/2005 | Evans | |
| 2005/0278651 A1 | 12/2005 | Coe et al. | |
| 2006/0041657 A1 | 2/2006 | Wen et al. | |
| 2006/0168642 A1 | 7/2006 | Tachizawa et al. | |
| 2007/0174490 A1 | 7/2007 | Choi et al. | |
| 2008/0077675 A1 | 3/2008 | Graef | |
| 2008/0220798 A1 | 9/2008 | Potluri et al. | |
| 2008/0222254 A1 | 9/2008 | Mukherjee | |
| 2009/0106650 A1 | 4/2009 | Haynes et al. | |
| 2009/0313099 A1 | 12/2009 | Errington | |
| 2010/0169446 A1 | 7/2010 | Linden et al. | |

FOREIGN PATENT DOCUMENTS

| | | |
|---|---|---|
| EP | 1903727 A2 | 3/2008 |
| WO | 2007/014351 A2 | 2/2007 |
| WO | 2010/023192 A2 | 3/2010 |

OTHER PUBLICATIONS

E-mail agent (infrastructure). (Sep. 1, 2010). In Wikipedia, The Free Encyclopedia. Retrieved 01:06, Nov. 15, 2010, from http://en.wikipedia.org/w/index.php?title=E-mail_agent_(infrastructure)&oldid=382207110.

MIME. (Nov. 5, 2010). In Wikipedia, The Free Encyclopedia. Retrieved 16:45, Nov. 15, 2010, from http://en.wikipedia.org/w/index.php?title=MIME&oldid=394975047.

XMPP Standards Foundation—XEP-0071 XHTML-IM, http://xmpp.org/extensions/xep-0071.html.

XMPP-CORE-01 http://tools.ietf.org/html/draft-saintandre-XMPP-CORE-01.

SIP-XMPP-IM-01 http://tools.ietf.org/html/draft-saintandre-sip-xmpp-im-01.

SIP-XMPP-CHAT-03 http://tools.ietf.org/html/draft-saintandre-sip-xmpp-chat-03.

XMPP-PRESENCE-02 http://tools.ietf.org/html/draft-saintandre-sip-xmpp-presence-02.

Open Mobile Alliance Standards: Instant Messaging and Presence Service (IMPS), Presence & Availability (PAG) and Messaging (MWG).

* cited by examiner

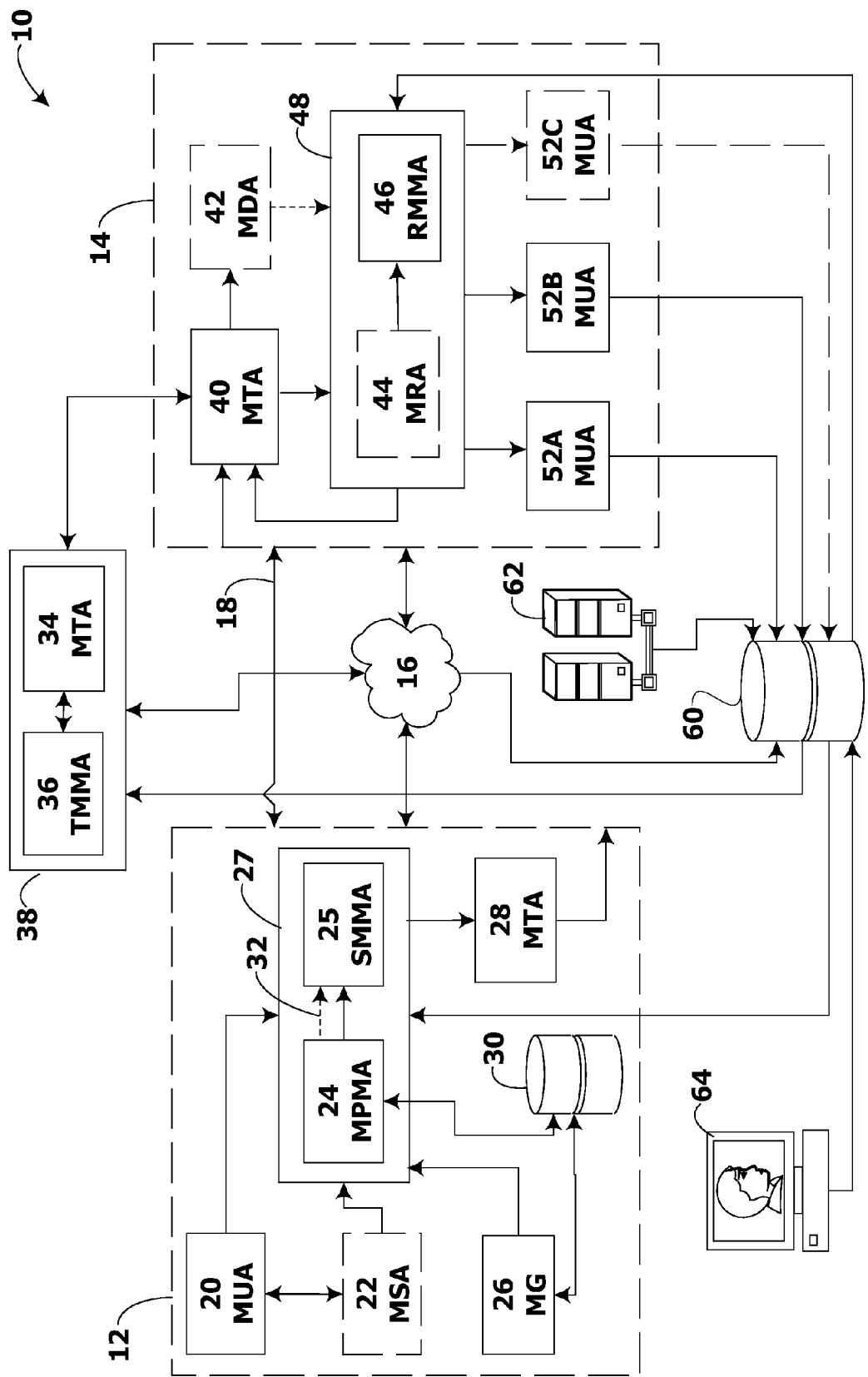

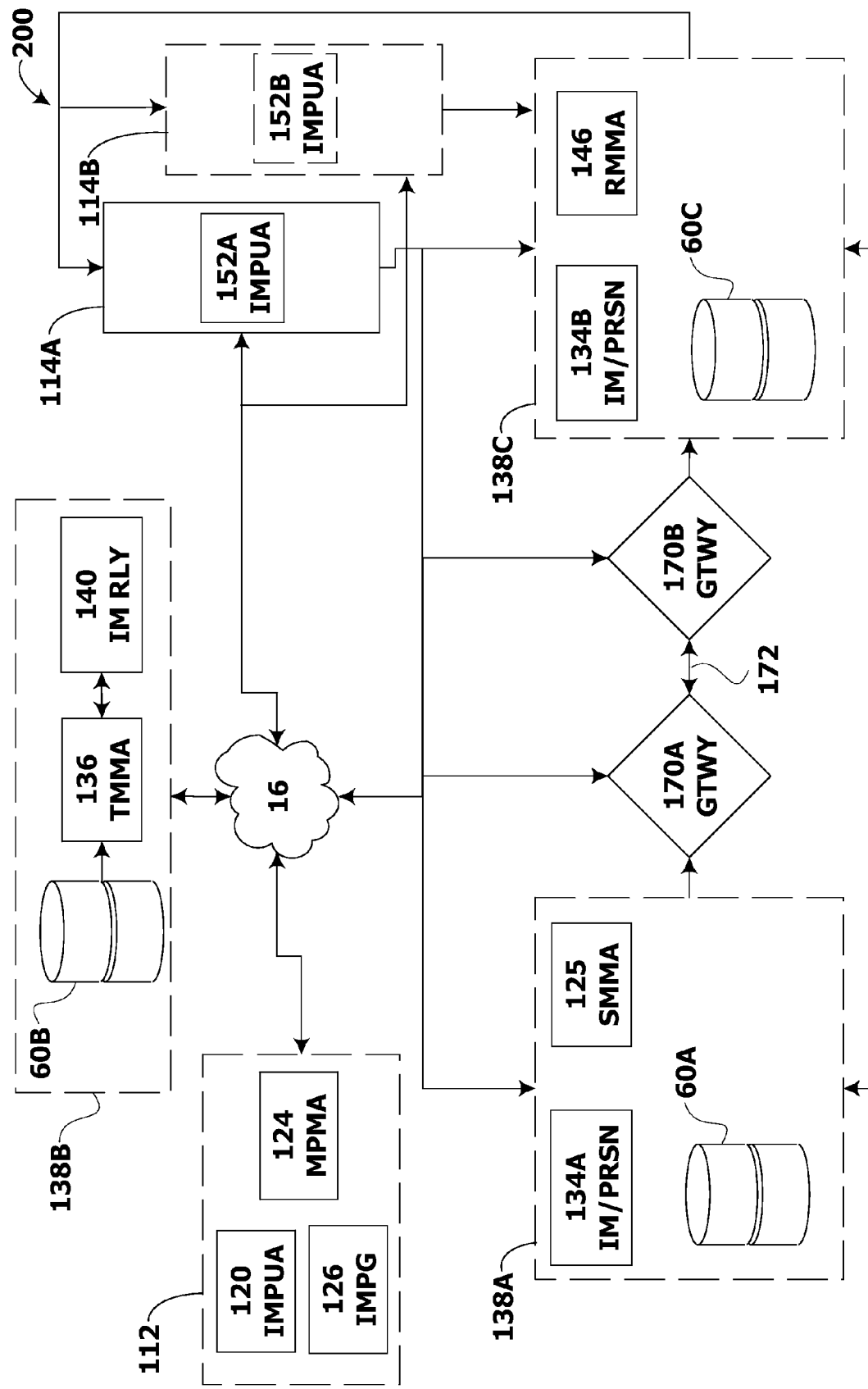

SYSTEMS AND METHODS FOR MESSAGING AND PRESENCE MODIFICATION

TECHNICAL FIELD

In general, the present invention pertains to the arts of telecommunications and/or computer networking. In particular, the invention relates to systems and methods for modifying electronic messages.

BACKGROUND ART

It is believed that the pertinent state-of-the-art is represented by: U.S. Pat. Nos. 7,392,289, 6,119,137, 7,010,757, 6,707,890 and 6,529,942; US patent application Ser. No. 2002/120600, 2008/077675, 2009/106650, 2002/016818, 2002/0147778, 2005/159135, 2006/168642, 2005/136908, 2006/041657, 2003/123104, 2005/0278651, 2008/0222254 and 2008/220798; German patent or patent application Ser. No. 102005042068; European patent application Ser. No. 1646001 as well as by international patent publication Nos. 2010/023192 and 2007/014351.

REFERENCES

RFC 2045, RFC 2046, RFC 2047, RFC 4288, RFC 4289 RFC 2049 and RFC 2388; RFC 2778, RFC 2779, RFC 3761, RFC 3762, RFC 3764, RFC 4725, RFC 3920, RFC 3921, RFC 3922, RFC 3923, RFC 4854, RFC 4974, RFC 5122, RFC 3428, RFC 3856, RFC 3857, RFC 3858 and RFC 4825 available from the Internet Engineering Task Force (IETF) at http://tools.ietf.org/html/

E-mail agent (infrastructure). (2010, Sep. 1). In Wikipedia, The Free Encyclopedia. Retrieved 01:06, Nov. 15, 2010, from http://en.wikipedia/org/w/index/php?title=E-mail agen (infrastructure)&oldid=382207110

MIME. (2010, Nov. 5). In Wikipedia, The Free Encyclopedia. Retrieved 16:45, Nov. 15, 2010, from http://en.wikipedia.org/w/index.php?title=MIME&oldid=394975047

XMPP Standards Foundation—XEP-0071 XHTML-IM, http://xmpp.org/extensions/xep-0071.html; XMPP-CORE-01 http://tools.ietf.org/html/draft-saintandre-XMPP-CORE-01; SIP-XMPP-IM-01 http://tools.ietf.org/htmldraft-saintandre-sip-xmpp-im-01; SIP-XMPP-CHAT-03 http://tools.ietf.org/html/draft-saintandre-sip-xmpp-chat-03; XMPP-PRESENCE-02 http://tools.ietf.org/html/draft-saintandre-sip-xmpp-presence-02.

OPEN MOBILE ALLIANCE STANDARDS: INSTANT MESSAGING AND PRESENCE SERVICE (IMPS), PRESENCE & AVAILABILITY (PAG) AND MESSAGING (MWG).

DEFINITIONS

Electronic messages or messaging, as referred to herein, should be understood as encompassing any type of telephony or computer network messaging and particularly messages transmitted over cellular networks, Internet and Ethernet. Instances of electronic messages include: the short message service (otherwise known as SMS), electronic mail (E-mail), instant messaging (IM), presence messaging, a personal message or private message (often shortened PM). Components of electronic messages as referred to herein inter alia include: text, alphanumeric data, audio files, video files, graphics and hyperlinks.

Multipurpose internet mail extensions (MIME) as referred to herein in a non-limiting manner include: RFC 2045, RFC 2046, RFC 2047, RFC 4288, RFC 4289 and RFC 2049. Open Mobile Alliance (OMA)—Instant Messaging and Presence Service (IMPS) Presence & Availability (PAG) and Messaging (MWG), standards' collection, XMPP standards' collection as referred to herein includes: RFC 3920, RFC 3921, RFC 3922, RFC 3923, RFC 4854, RFC 4974, RFC 5122. SIMPLE—Session Initiation Protocol for Instant Messaging and Presence standards' collection as referred to herein includes: RFC 3428, RFC 3856, RFC 3857, RFC 3858 and RFC 4825.

Cellular network, as referred to herein, should be understood as encompassing any type of mobile telephony system and particularly cellular networks. Instances of mobile telephony systems inter alia include networks compliant with standards known in the art as: MTS, MTA, MTB, MTC, IMTS, MTD, AMTS, OLT, Autoradiopuhelin, AMPS, TACS, ETACS, NMT, Hicap, Mobitex, DataTAC, GSM, CSD, 3GPP2, CdmaOne (IS-95), D-AMPS (IS-54 and IS-136),CDPD, iDEN, PDC, PHS, GSM/3GPP, HSCSD, GPRS, EDGE/EGPRS, 3GPP2, CDMA2000 1xRTT (IS-2000), WiDEN, 3G (IMT-2000), 3GPP, UMTS (UTRAN), WCDMA-FDD, WCDMA-TDD, UTRA-TDD LCR (TD-SCDMA), 3GPP2, CDMA2000 1xEV-DO (IS-856), HSDPA, HSUPA, HSPA+, LTE (E-UTRA), EV-DO Rev.A, EV-DO Rev.B, Mobile WiMAX (IEEE 802.16e-2005), Flash-OFDM, IEEE 802.20, LTE Advanced and IEEE 802.16.

Whenever the term "server", "agent" or "module" is used herein, it should be construed as a computer program, including any portion or alternative thereof, e.g. script, command, etc., and/or a hardware component/s, including configurations or assemblies thereof,such computer storage media, computer micro-processors and operative memory as well as any combination of the former with the latter.

The term integrated shall be inter alia construed as—operable on the same machine and/or executed by the same computer program. Depending on the actual deployment of the method, its implementation and topology, integration of agents and/or integration into modules as well as the terms "transfer", "relaying", "transmitting", "forwarding", "retrieving", "accessing", "pushed" or similar refer to any interaction between agents via methods inter alia including: function calling, API (Application Programming Interface), IPC (Inter-Process Communication), RPC (Remote procedure call) and/or communicating using of any standard or proprietary protocol, such as SMTP, IMAP, MAPI, OMA-IMPS, OMA-PAG, OMA-MWG, SIP/SIMPLE, XMPP, SMPP.

DESCRIPTION OF THE DRAWINGS

The present invention will be understood and appreciated more comprehensively from the following detailed description taken in conjunction with the appended drawings in which:

FIG. 1 is a schematic high-level block diagram of an embodiment of the system of the invention implementable ad hoc modification of electronic mail;

FIG. 2B is a schematic high-level block diagram of yet another embodiment of the system of the invention implementable ad hoc modification of instant messages;

Figure 2A:
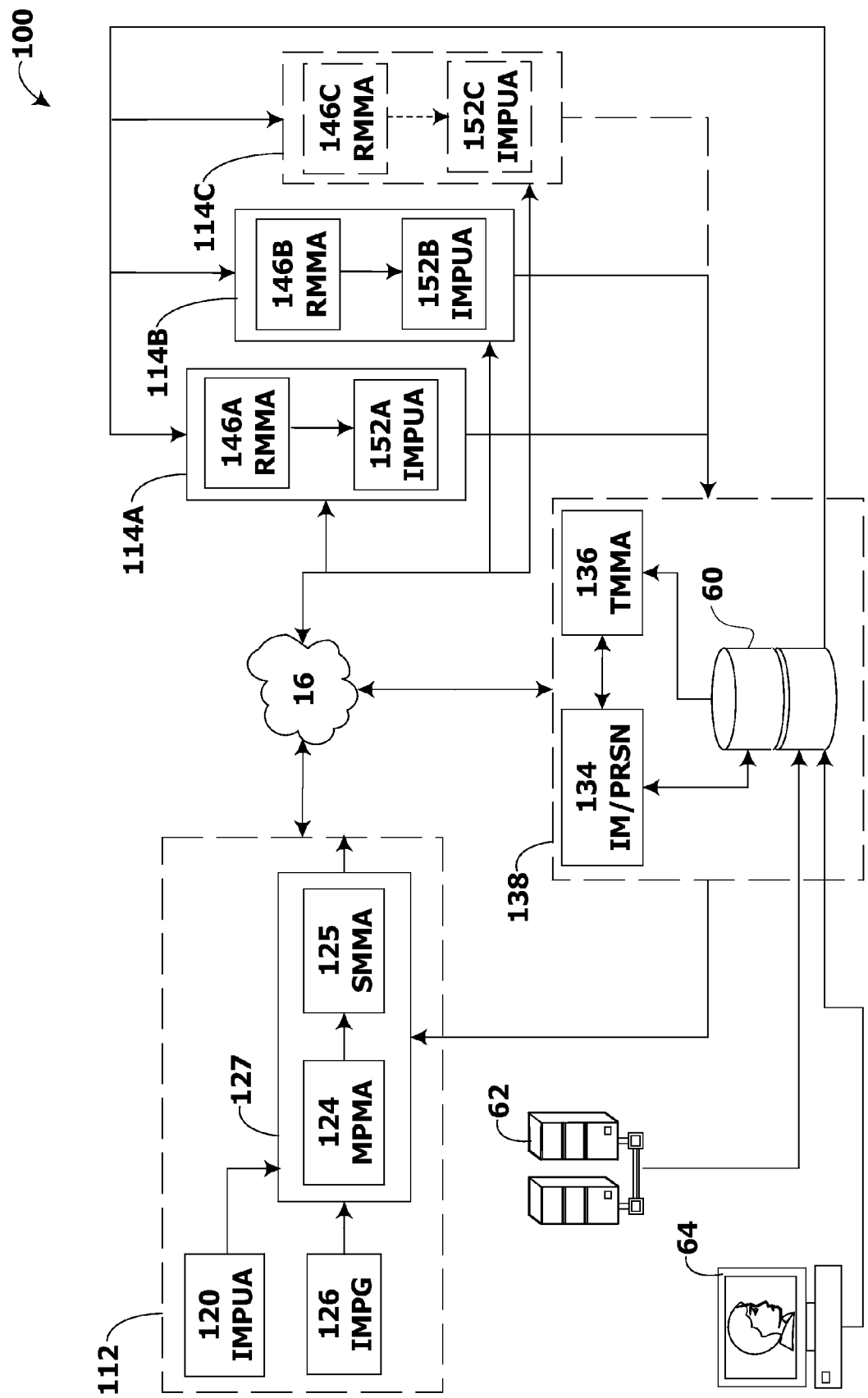
FIG. 2A is a schematic high-level block diagram of another embodiment of the system of the invention implementable ad hoc modification of instant messages.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DESCRIPTION OF EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with technology-or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

Configuration 1

In accordance with some embodiments of the present invention, reference is now made to FIG. 1, showing electronic messages modifying system 10. System 10, as elaborated infra, embodies an exemplary electronic mail (E-mail) modifying system. System 10 comprises sender moiety 12 and recipient moiety 14. Sender moiety 12 is connected to recipient moiety 14 through worldwide computer network 16 (frequently referred to as the internet) and/or other telecommunication link 18.

Sender moiety 12 comprises sending terminal 20. In the instance of electronic messaging modification, sending terminal 20 is a message user agent (henceforth MUA), which is frequently referred at the colloquial language as client. MUA 20 is used for the composition of the electronic message and formatting thereof. Electronic messages produced by MUA 20 typically comprise a body and header, wherein the former typically includes the content of the message intended for the view by the recipient, whereas the latter contains metadata of the message, necessary for the transmittal and delivery thereof.

The headers of electronic messages produced by MUA 20 are preferably compliant with multipurpose internet mail extensions (MIME) internet standard collection and particularly with: RFC 2045, RFC 2046, RFC 2047, RFC 4288, RFC 4289 and RFC 2049. The electronic messages produced by MUA 20 in a non-limiting manner include: text, alphanumeric data, audio files, video files, graphics and hyperlinks.

Sender moiety 12 optionally further comprises message submission agent (henceforth MSA) 22, interactively cooperating with MUA 20, essentially as known in the art. A new electronic message produced by MUA 20 is transmitted, either via MSA 22 or directly, to message pre-modification agent 24 (henceforth MPMA).

Alternatively or additionally message generator 26 is implemented ad hoc generating numerous electronic messages in a relatively short period of time. Message generator 26 is typically employed in corporate setups, for generating numerous messages to multiple addresses, for instance for the clientele, employees personnel or subscribers to an information service, social network, any type of client service and alike. Message generator 26 is optionally connected to internal sender database 30, including the addresses and pre-modification parameters of the addressees, as elaborated hereunder. Electronic messages generated by message generator 26 are typically transmitted directly to MPMA 24.

MPMA 24 receives incoming messages from MUA 20, MSA 22 or generator 26 and applies a pre-modification thereto. A pre-modification comprises a modification of the metadata at the header of the messages and/or bodies thereof. The pre-modification is optionally performed in respect to at least one predefined constituent in the header and/or body of the message, intended for the recipient, without altering or modifying said constituent per se. An example of a predefined constituent in the header of the message is a field allocated within a HTML structured form, presented for the view by the recipient at the message body, in accordance with RFC 2388. The term intended as referred to herein is to be construed as inter alia intended for the view of the recipient.

The pre-modification is performed by prescribing a conditional action, hereinafter pre-modification parameter, in respect to one or more predefined constituents in the body and/or header of the message, of the message intended for the recipient. A pre-modification parameter is typically appurtenant to a qualitative characteristic or numerical range of a modification parameter; an exemplary detailed specification of modification parameters is provided below.

The code of the pre-modification parameters can be embedded, irrespectively, in the header and/or body of the message. The code of the pre-modification parameters embedded in the body of the message is typically hidden from the view of the recipient. The code of the pre-modification parameters is utilized by a message modification agent (hereinafter MMA); MMA include sender, recipient and/or transfer MMAs, as detailed infra.

MPMA 24 retrieves pre-modification parameters from internal sender database 30 and embeds them in the header and/or body of the message. For instance a pre-modification parameter can be assigned to a TRUE/FALSE value, respectively indicating the presence/absence of a particular software program installed on the recipient MUA machine. Thus if a particular software program is installed on the recipient MUA machine, namely the pre-modification parameter is TRUE, a corresponding modification parameter is applied by a MMA and a script launching the particular software program is consequently embedded in a predefined field in the body of the message. Alternatively an IP address, universal resource identifier (URI) and/or locator (URL) for retrieving the aforementioned launching script can be embedded mutatis mutandis in a predefined field in lieu of embedding the script itself. If a particular software program is not installed on the recipient MUA machine, namely the pre-modification parameter is FALSE, a corresponding modification parameter is applied by MMA and a hyperlink for downloading the particular software program is consequently embedded in the aforementioned or other predefined field in the body of the message.

In another instance a pre-modification parameter can be assigned to a numeric range divided into three numeric sub-ranges, respectively indicating the GUI screen size and/or resolution on the recipient MUA machine. Thus if GUI screen size is within the first numeric sub-range, a corresponding modification parameter is applied by MMA and merely one third of the textual content of the message is consequently presented, by showing only the first of the three adjacent fields in which the textual content of the message is allocated. If GUI screen size is within the second numeric sub-range, a corresponding modification parameter is applied by MMA and thus the first and the second of three adjacent fields allocated for textual content are consequently presented, showing about two thirds of the textual content of the message, etc.

The predefined fields are typically allocated within a HTML structured message body, in accordance with RFC 2388, the content of which is incorporated herein by reference. Data/files necessary for the modification of the message are typically either contained within attachments of the message or obtainable from an IP address, URI and/or URL.

The pre-modified message, containing pre-modification parameters, is transmitted to message transfer agent 28 (MTA), together or alongside 32 the body of the message. From MTA 28 the message is further transferred through computer network 16 and/or other telecommunication link 18 to recipient moiety 14.

Configuration 2

Alternatively or additionally sender moiety 12 of system 10 comprises sender modification agent (SMMA) 25. SMMA 25 receives incoming messages from MUA 20, MSA 22, message generator 26 or MPMA 24 and applies a modification hereto. The modification of the messages by SMMA 25 comprises a modification of the message body and/or the metadata at the header thereof. The modification of the messages by SMMA 25 is performed by modifying a constituent of the message intended for the recipient.

The modification of the message body is applied to at least one predefined constituent in the body of the message. The modification of the messages by SMMA 25 is performed in accordance with at least one modification parameter of the recipient, retrieved from database 60. Database 60 can be integrated within recipient moiety 14 or form an independent constituent of system 10. The modification of the messages by SMMA 25 is optionally performed in accordance with pre-modification parameters prescribed by MPMA 24.

The modification parameters, utilized for the modification of the messages by SMMA 25, typically refer to relatively constant and/or static qualities/characteristics of the recipient profile and/or properties of the recipient MUA machine, such as the model/type of the hardware and/or configuration thereof on the recipient MUA machine and/or user profile properties. The reason for preferring modification parameters that refer to relatively constant qualities/characteristics is that a message transmitted from sender moiety 12 at a given time can be retrieved by, accessed by and/or pushed to the recipient indefinite time thereafter. Therefore, the modification of the messages by SMMA 25, which is actually and unconditionally alters the content of the message and/or body thereof viewable by the recipient, is preferably performed in accordance with qualities/characteristics which are less probable to change until the message is actually retrieved by, accessed by and/or pushed to the recipient.

For instance if the recipient MUA is a Macintosh type of machine or operating system, a UNIX executable script is embedded in a predefined field, typically allocated within a HTML structured message body, in accordance with RFC 2388. In other instance if a profile property indicates a particular gender of the user, gender-specific textual/graphical information is included in the body and/or header of the message; alternatively if the gender of the user cannot be established, unisex information is included in the body and/or header of the message.

In some configurations MPMA 24 and SMMA 25 are integrated into unitary module 27. In other configurations MPMA 24 is integrated (not shown) with message generator 26, MUA 20 and MSA 22, thereby initially producing messages containing pre-modification parameters. Therefore message generator 26, MUA 20 and/or MSA 22 is optionally connected to internal sender database 30 to retrieve pre-modification parameters therefrom. In yet other configurations SMMA 25 is integrated (not shown) with MTA 28.

Subsequently, messages pre-modified by MPMA 24 and/or modified by SMMA 25 are transmitted to MTA 28, together or alongside 32 the body of the message. From MTA 28 the message is further transferred through computer network 16 and/or other telecommunication link 18 to recipient moiety 14. In recipient moiety 14, messages are received by recipient MTA 40. The transfer of the messages from MTA 28 to recipient MTA 40 is performed essentially in accordance to methods known in the art.

Configuration 3

In some embodiments, system 10 is configured as an external service provider adapted for the modification of messages sent form moiety 12 to moiety 14. A message sent from MTA 28 and intended for a particular recipient MTA 40 is directed first to MTA 34, via internet 16, as an external service provider. The directing of the message sent from MTA 28 and intended to a particular recipient MTA 40 to MTA 34 instead is preferably achieved by assigning the IP address of MTA 34 as mail exchanger record (MX record) or a service record (SRV record) on the domain name system (DNS); thereby upon resolving with the DNS the destination IP address of a particular recipient, MTA 28 receives the IP address/port of MTA 34 and consequently directs the message thereto.

Incoming message received by MTA 34 are forwarded to transfer MMA (TMMA) 36. TMMA 36 preferably retrieves an updated set of modifications parameters from database 60 and subjects the message forwarded from MTA 34 to a modification. The modification of the messages by TMMA 36 is performed in accordance with modification parameter of the recipient as retrieved from database 60. Database 60 can be integrated within recipient moiety 14 or form an independent constituent of system 10. The modification of the messages by TMMA 36 is optionally performed in accordance with pre-modification parameters prescribed by MPMA 24.

Messages modified by TMMA 36 are returned to MTA 34 and thereafter transmitted to recipient MTA 40, to be thereafter retrieved by, accessed from and/or pushed to recipient MUAs 52 A-C; the term MUAs as used herein should be construed as any number of MUAs larger than one. In some configurations TMMA 36 and MTA 34 are integrated in unitary module 38, as an external service provider in system 10.

In some configurations, an incoming message is received by MTA 40 in recipient moiety 14 and thereafter forwarded to TMMA 36 or module 38, modified therein, and subsequently returned to MTA 40 in order to be stored in MTA 40 or MDA 42, until retrieved by, accessed from and/or pushed to recipient MUAs. In some instances, an incoming message is transmitted by MTA 40 to TMMA 36 or module 38 and/or returned from TMMA 36 or module 38 to MTA 40 via internet 16, whereas in other instances the message is transmitted by MTA 40 to TMMA 36 or module 38 and/or returned from TMMA 36 or module 38 to MTA 40 via a communication link other than internet 16; for example by employing a proxy configuration.

Configuration 4

In recipient moiety 14, messages received by recipient MTA 40 are further transmitted to recipient MMA (RMMA) 46. Alternatively or additionally messages received by recipient MTA 40 are transmitted to and stored by delivery agent 42 (hereinafter MDA); MDA and MTA is to be construed as including a storage facility, e.g. mailbox, etc. From MDA 42 messages are retrieved by mail retrieval agent 44 (hereinafter MRA). Noticeably, the step of retrieving the message from MDA 42 to MRA 44 is a pull step; therefore an incoming message is stored by MDA 42 until it is retrieved by MRA 44 as a pull step. Messages received by recipient MTA 40 or retrieved by MRA 44 from MDA 42 are further transmitted to RMMA 46. If the configuration of recipient moiety 14 does not employ MDA 42 and/or MRA 44, the messages received by recipient MTA 40 are transmitted to RMMA 46, typically as a push step.

MRA 44 and RMMA 46 are optionally integrated into unitary module 48, receiving messages pushed from MTA 40 or retrieved from MDA 42. In some configurations MDA 42 is included in unitary module 48. Preferably the configuration of recipient moiety 14 employs MRA 44, entailing the aforementioned pull step, for an effective handling modification of messages for a plurality of recipient MUAs, as will be elaborated infra.

RMMA 46 and/or unitary module 48 is connected to database 60 which can be integrated within recipient moiety 14 or form an independent constituent of system 10. Database 60 contains modification parameters of the recipient and/or recipient MUA machine. Modification parameters are typically retrieved from database 60 by RMMA 46 and/or unitary module 48. Modification parameters are typically retrieved from database 60 by RMMA 46 and/or unitary module 48 a retrieval of at least one type, of the two types explained immediately hereafter.

Retrieval of the first type is defined as the retrieving, of modification parameters, by RMMA 46 and/or unitary module 48 from database 60, performed upon the receipt of an incoming message by MTA 40, RMMA 46 or unitary module 48. Retrieval of the second type is defined as the retrieving, of modification parameters, by RMMA 46 and/or unitary module 48 from database 60, performed upon an access or retrieval of a message by MUAs 52 A-C from MRA 44, RMMA 46, module 48 or MDA 42. A retrieval of the first type and/or second type, optionally, initiates an active dynamical update process of database 60, as explained below. A retrieval of the first type and/or second type is mutatis mutandis performed by TMMA 36.

RMMA 46 and/or module 48 receive the incoming messages and subject the same to at least one modification of three types. A modification of the first type is performed in accordance with pre-modification parameters prescribed by MPMA 24. The modification of the first type is typically performed either upon the receipt of an incoming message by MTA 40, RMMA 46 or module 48 or upon an access or retrieval of a message by MUAs 52 A-C from MRA 44, RMMA 46, module 48 or MDA 42.

A modification of the second type is preferably performed upon the receipt of an incoming message by MTA 40, RMMA 46 or module 48. The modification of the second type is typically accompanied by and performed in accordance with modification parameters retrieved from database 60 a retrieval of the first type. Subsequently to the modification of the second type, the modified message is stored at MRA 44, RMMA 46, module 48 or MDA 42 until retrieved by, accessed from and/or pushed to recipient MUAs 52 A-C. In some configurations, an incoming message is forwarded from MTA 40 to RMMA 46, modified therein, and subsequently returned to MTA 40 in order to be stored in MTA 40 or MDA 42, until retrieved by, accessed from and/or pushed to recipient MUAs 52 A-C from MRA 44, RMMA 46, module 48 or MDA 42.

A modification of the third type is preferably performed upon an access to, retrieval by or pushing of a message to MUAs 52 A-C from MRA 44, RMMA 46, module 48 or MDA 42. The modification of the third type is typically accompanied by and performed in accordance with modification parameters retrieved from database 60 a retrieval of the second type. The modification of the third type implies an availability of more updated modification parameters, since the modification of the third type is effected promptly prior to an access or retrieval of a message by MUAs 52 A-C. The modification of the third type is preferably implemented in recipient moiety 14 the configuration of which employs MRA 44, wherein the modification is performed conjointly with a pull step, during which a message is retrieved from MDA 42 by MRA 44 or from MTA 40 by MUAs 52 A-C, providing for effectively handling a modification of messages for a plurality of recipient MUAs, as described below.

A modification of the fourth type is typically performed in accordance with modification parameters other than these retrieved from database 60. Modification parameters for the modification of the fourth type are typically either obtainable from ubiquitous sources, such as the present time and date or extracted from appurtenant attributes of the message itself, for instance the language of the message, the top-level domain (TLD) and/or the domain name of the recipient's message address, etc.

The modification of the fourth type is applicable to SMMA 25 and/or TMMA 36 and/or RMMA 46. The modifications of the first, second and third types are mutatis mutandis applicable to TMMA 36. The modifications of the second and/or third types are optionally combined with the modification of the first and/or fourth types.

Messages modified by RMMA 46 or module 48 are further transferred to, retrieved by, accessed by and/or pushed to recipient MUAs 52 A-C, essentially in accordance with methods known in the art and preferably in accordance with post office protocol (POP) and/or internet mail access protocol (IMAP), standardized in RFC 1064, and/or MAPI and/or MAPI/RPC.

Modification Parameters and Dynamic Update Thereof

Modification parameters as referred to herein typically comprise several main categories. The first category of modification parameters pertains to various qualities/characteristics of recipient MUA device. Qualities/characteristics are obtained from the device the recipient MUA is running on, exemplarily in accordance to the methods disclosed in US Patent Application Ser. No. 2005/136908, entitled "SYSTEM AND METHOD TO QUERY SETTINGS ON A MOBILE DEVICE," the content of which is incorporated herein by reference, or in accordance with other methods known in the art. Modification parameters of the first category are optionally associated with a physical IP address, IMEI address or MAC address of the device of recipient MUA, such as MUAs 52 A-C.

Modification parameters pertaining to various qualities/characteristics of recipient MUA device include but are not limited to the selected from the list below:

1. the type and/or model of the hardware components and/or configuration thereof on the recipient MUA machine (an example of a static quality/characteristic), such as the type of the machine (e.g. mobile phone, personal computer, etc.); GUI screen type, size or resolution, 2D or 3D screen; camera, processor power, random access memory size, type of input devices e.g. screen accessed with remote control, touch screen, keyboard, voice recognition, or motion sensor, as well as other hardware profile information;
2. the state and/or capacity of selected hardware components, such as the presence of external power source, electrical battery state, available storage space;
3. the type and/or model of the firmware stored in read only memory;
4. dynamic properties, such as GPS positioning, camera connectivity, voice recognition state, speaker phone on/off, attached to headset, attached to projector, currently in motion e.g. average speed, roaming, etc.;
5. the operating system running on the device and version thereof;
6. the list of device programs installed, their respective versions and configurations;
7. list of content stored on the device such as music, movies, photos, ringtones and alike.
8. the preferences and/or configuration of the device, e.g. language settings, Wi-Fi on/off, 3G availability.

The second category of modification parameters pertains to various qualities/characteristics of the service provided by the network operator for recipient MUA device. Modification parameters of the second category can be associated with a unique ID such as: logical IP address, IMEI address, MAC address, email address, any other user credentials of the recipient MUA device. Modification parameters of the second category can be automatically resolved, essentially as known in the art, upon a connection of a particular recipient MUA device to a network operated by a specific service provider, such as service provider 62. Modification parameters of the second category are often identified with a particular client/user of a service provided by a network operator, such as a connection to internet from a particular Wi-Fi point.

Modification parameters pertaining to various qualities/characteristics of the service provided by the network operator of the recipient MUA device include but are not limited to selected from the list below:
9. ambient conditions, strength and/or availability of the cellular network signal; (an example of a dynamic quality/characteristic),
10. the current or most common geographical location and/or present time;
11. availability and/or the bandwidth of network connection;
12. types of services the user is subscribed to and/or other customer profile related information, e.g. credit available, data package type.

The third category of modification parameters pertains to user profile properties. Modification parameters of the third category are typically associated with a particular messaging account and/or particular person or entity. Thus a messaging account managed on MTA 40 can be assigned with a set of modification parameters that are characteristic of the properties and/or preferences of the account addressee. Modification parameters pertaining to user account profile, inter alia include:
13. messaging account, e.g. email address, establishing a Unique Identity (hereinafter UID) of the user; messaging account should be interpreted to encompass any account and/or profile entity of the recipient, typically associated with an individual person; this particularly includes any type of username at a specific domain, while username is optionally an email address, for instance a username at Facebook domain might be any email address, inter alia of a syntax xxxx@yyyy.com.
14. personal user information, such as gender, age, wearing glasses, hearing impairment, other disabilities, marital status, hometown, language preference, etc.;
15. Dynamic parameters of the user, e.g. awake or asleep, heart rate, mood, driving, running speed, etc.;
16. preferences specified at the account;
17. message box quota and current available size, last time and device accessed the accessed messaging account, number of devices occasionally used;
18. types and extents of activities, as analyzed by the messaging account manager.

The fourth category of modification parameters pertains to various qualities/characteristics of external service providers. External service providers in a non-limiting manner include information services, subscription services, social networks and consumer services the recipient is registered to and/or subscribed to. Modification parameters of the fourth category can be associated with the message address or any other credentials of the recipient, a unique ID of the service provider as well as with logical IP address, IMEI address or MAC address of the MUA device.

Modification parameters pertaining to service providers, inter alia include:
19. personal user information, such as gender, date of birth, wearing glasses, hearing impairment, other disabilities, marital status, hometown, language preference, sexual preference etc;
20. types and extents of activities, as analyzed by the service provider.
21. browsing and/or usage patterns and history;
22. contact list and social graph;
23. device currently used and devices used before;
24. advertisement consumed on the particular service;
25. purchase history;
26. available credit;
27. preferences specified by the user.

Modification parameters of the aforementioned four categories are stored within database 60 in respectively allocated sub-entries. Modification parameters of each category are preferably stored, allocated within a respective sub-entry. Each sub-entry contains a list of modification parameters pertaining for a MUA devices, network operators, user/account profile properties or service providers, alongside the values thereof. Modification parameters are typically either qualitative data, specifying characteristics/properties of recipient MUA machine and/or user profile, or quantitative data, specifying the numerical values, such as size, capacity, strength, etc.

Modification parameters from different categories can be combined in a single composite entry, by selecting parameters from different sub-entries. Composite entry is typically either static or dynamic. Static composite entries refer to relatively constant combinations of characteristics/properties of MUA devices, network operators, user account properties and/or service providers, represented by modification parameters from different categories, in respective sub-entries. Static composite entries are typically created and preferably prompted as a part of an installation and/or setup of MUA application on a particular device. Dynamic composite entries refer to somewhat transient combinations of MUA device, network operator and/or user properties. A dynamic composite entry is typically a characteristic of a web-based MUA interface, otherwise known as webmail, wherein the same user profile properties are frequently combined with different MUA devices and/or network operators. A dynamic composite entry is typically a characteristic of mobile phones and laptop computers, wherein the same user profile properties and MUA device are frequently combined with different network operators and service providers. The combination of the static or dynamic entries is typically performed by an association of the constituent sub-entries with the UID of the user.

Modification parameters in database 60 are dynamically updated from recipient MUAs 52 A-C machines, upon a process actively initiated by recipient MUAs 52 A-C machines, in accordance with a predefined schedule and/or triggered by a prescribed event and/or change in MUA machine registry, such as the last device operable for running recipient MUA, turning the recipient MUA device on, logging into MUA device operating system, launching MUA application, installing of a new application, low disk alert, computer program update, retrieving of and/or accessing to a message by MUAs 52 A-C, etc. The update process can be actively initiated by some computer program other than MUAs 52 A-C running on the recipient MUA machine.

Alternatively or additionally modification parameters in database 60 are updated upon a process actively initiated by service provider 62, providing computer network communication services for MUAs 52 A-C machines. The update of modification parameters by service provider 62 is typically either initiated in accordance with a predefined schedule and/or triggered by a prescribed event, such availability/unavailability of recipient MUA machine on a cellular network, positioning of the recipient MUA machine in a particular geographical location, limitations on data package by network operator, change and/or excess of a threshold network bandwidth, change and/or excess of a threshold on network access tariffs, subscription to an online information service, etc.

Alternatively or additionally modification parameters in database 60 are updated by the holder of the account for messaging service, such as the manager of the recipient account on MTA 40. Optionally, modification parameters in database 60 are updated by from terminal interface 64, dedicated ad hoc inputting user profile properties and or preferences. Interface 64 is optionally accessible via internet 16. Alternatively or additionally modification parameters are pushed into database 60 from internet 16.

Alternatively or additionally modification parameters in database 60 are updated by incurring internet 16, service provider 62 and/or MUAs 52 A-C machines, upon a process actively initiated by the database management system (DBMS) of database 60. The update of modification parameters actively initiated by the DBMS of database 60 is typically performed in accordance with a predefined schedule.

Alternatively or additionally modification parameters in database 60 are updated by various service providers. Modification parameters updated by service providers are typically pushed to the DBMS of database 60 from internet 16. Optionally modification parameters from service providers are retrieved actively by a process initiated by the DBMS of database 60.

Preferably the dynamic update of modification parameters in database 60, performed upon a process initiated by the DBMS of database 60 by actively incurring internet 16, service provider 62 and/or MUAs 52 A-C machines, is triggered by and optimally completed prior to the retrieval of modification parameters SMMA 25, retrieval of modification parameters TMMA 36 as well as the aforesaid retrieval of the first type and/or second type performed by RMMA 46. The retrieval of modification parameters by SMMA 25, TMMA 36 as well as the aforesaid retrieval of the first type and/or second type performed by RMMA 46 is inter alia performed via internet 16.

Alternatively or additionally modification parameters in database 60 are updated by an appliance. In some instances an appliance is a refrigerator or a computerized warehouse inventory system, capable of monitoring the amount and/or the condition of the goods store therein. Modification parameters updated by an appliance are typically pushed to the DBMS of database 60 from internet 16. Optionally modification parameters from an appliance are retrieved actively by a process initiated by the DBMS of database 60.

Modification of Messages for Multiple Recipients

Should recipient moiety 14 comprise a plurality of recipient MUAs 52 A-C machines, the following system configurations and/or respective embodiments of the method of the present invention are implementable for handling a modification of messages delivered thereto.

In some embodiments messages modified chiefly by SMMA 25, prior to the transmittal thereof to the recipient. Message intended to a recipient employing multiple recipient MUAs, such as MUAs 52 A-C, typically running on different machines, modified by SMMA 25 in accordance with modification parameters allocated primarily within a composite entries in database 60, comprising a plurality of sub-entries representing the respective combinations of characteristics/properties of MUA devices, network operators, user account profile and/or service providers, associated with particular UID. In such a case, upon retrieval of modification parameters, SMMA 25 receives from database 60 a plurality of dynamic or static composite entries associated with a given recipient/address/account and consequently generates a respective number of copies from the message, thereafter referred to as a plural modification. Each copy is modified in accordance with the combination of modification parameters in a particular composite entry. The body or the metadata at the header of the message is altered to indicate the identity of the respective composite entry in accordance with whose parameters the modification was performed. Thereafter the modified copies of the message are transmitted to the recipient.

The plurality of the modified copies of the message is received by MTA 34, MTA 40 or module 38 and/or stored therein or in MDA 42, until retrieved by, accessed from and/or pushed to recipient MUAs 52 A-C. Upon accession, retrieval or pushing of a message by/to a MUA, of MUAs 52 A-C, the particular combination of characteristics/properties of MUA devices, network operators, user account profile and/or service provider is established and consequently only the copy of modified message with identity corresponding to respective composite entry is selected. In such a case TMMA 36, module 48, RMMA 46, MTA 40, MRA 44 or module 48 is furnished with capability of selecting the particular copy of the modified message corresponding to the identity of the respective composite entry.

The plural copies of the modified of the message stored by MDA 42, MTA 34, MTA 40 or module 38 are managed, mutatis mutandis, in accordance with methods known in the art and particularly in accordance with post office protocol (POP) and/or internet mail access protocol (IMAP), standardized in RFC 1064, and/or MAPI and/or MAPI/RPC.

In some embodiments messages modified primary by TMMA 35, subsequent to the transmittal thereof from MTA 28 but prior to the receipt thereof by MTA 40 and/or retrieval by, accession from and/or pushing to recipient MUAs 52 A-C. Message intended to a recipient, represented by the UID thereof, employing multiple recipient MUAs, such as MUAs 52 A-C, modified and managed by TMMA 35 mutatis mutandis as set forth supra, in the context of SMMA 25, by generating a number of copies from the message, respective to the number of recipient MUAs established per given UID, as represented by composite entries in database 60, storing modified copies in MTA 34 or module 38 and thereafter selecting a copy of the message corresponding to the particular combinations of characteristics/properties of MUA devices, network operators, user account profile properties and/or service providers. Such a modification is defined as a modification of the second type.

In other embodiments messages modified primary by RMMA 46, subsequent to the receipt thereof by MTA 40 but prior to the retrieval by, accession from and/or pushing thereof to recipient MUAs 52 A-C. Message intended to a recipient, represented by the UID thereof, employing multiple recipient MUAs, such as MUAs 52 A-C, modified and managed by RMMA 46 mutatis mutandis as set forth supra, in the context of SMMA 25, by generating a number of copies from the message, respective to the number of MUAs established per given UID, as represented by composite entries in database 60, i.e. a plural modification, storing modified copies in MTA 40 or MDA 42 and thereafter selecting a copy of the message corresponding to the particular combinations of characteristics/properties of MUA device, network operator and/or user profile properties. Such a modification is defined as a modification of the second type.

In some preferred embodiments messages modified by TMMA 36 or RMMA 46 solely upon retrieval by, accession from and/or pushing to recipient MUAs 52 A-C. In such instances a message of a general format, which is optionally pre-modified by MPMA 24 and/or modified SMMA 25 beforehand, is stored by MTA 34, MTA 40, MDA 42 or module 38 until retrieved by, accessed from and/or pushing to recipient MUAs 52 A-C. Upon establishing a connection, logging-in or initiating of a session by recipient MUAs 52 A-C, a temporary copy is created from the general format message. The temporary copy is then subjected to modification by TMMA 36 or RMMA 46 and the resulting modified copy is thereafter retrieved by, accessed from and/or pushed to MUAs 52 A-C; thereafter a temporal singular modification.

Such a modification is defined as a modification of the third type and preferably preceded by a retrieval of the second type; including retrieval of modification parameters from database 60 performed by TMMA 36 and/or module 38. The general format message is stored by MDA 42, MTA 34, MTA 40 or module 38 and managed, mutatis mutandis, in accordance with methods known in the art and particularly in accordance with post office protocol (POP) and/or internet mail access protocol (IMAP), standardized in RFC 1064 and/or MAPI and/or MAPI/RPC.

Configuration 5

In accordance with some embodiments of the present invention, reference is now made to FIG. 2A, showing electronic messages modifying system 100. System 100, as elaborated infra, embodies an exemplary instant messages (IM) and/or presence modifying system; presence as referred to herein inter alia standardized in RFC 2778. System 100 comprises sender moiety 112 and recipient moieties 114A to 114C. Sender moiety 112 is typically connected to recipient moieties 114A to 114C through worldwide computer network 16, which is typically referred to as the internet, and/or other telecommunication link (not shown).

Sender moiety 112 comprises sending terminal 120. In the instance of instant messaging modification, sending terminal 120 is an instant messaging/presence user agent (henceforth IMPUA), which is frequently referred at the colloquial language as client. The terminology referring to the constituents equivalent in their functionality to IMPUA is not standardized in the art, rather the following non-limiting examples are provided to illustrate the functional character thereof:

1. Open Mobile Alliance (OMA)—Instant Messaging and Presence Service (IMPS); OMA—Presence & Availability (PAG), OMA—Messaging (MWG); XMPP—RFC 3920, 3921, 3922, 3923, 4854, 4974, 5122.
2. SIMPLE—Session Initiation Protocol for Instant Messaging and Presence—RFC 3428, 3856, 3857, 3858 and 4825.

IMPUA 120 is used for the composition of electronic messages and formatting thereof. Electronic messages produced by IMPUA 120 in a non-limiting manner include: text, alphanumeric data, audio files, video files, graphics and hyperlinks. Various constituents of the electronic messages produced by IMPUA 120 are disposed within predefined fields allocated in an XML HTML or XHTML structured forms; wherein an instance of the latter is inter alia referred to as XHTML-IM, as defined as ad n XEP-0071 standard draft. Electronic messages generated by message generator IMPUA 120 are transmitted to MPMA 124.

Alternatively or additionally message generator 126 is implemented ad hoc generating numerous electronic messages in a relatively short period of time. Message generator 126 is typically employed in consumer services and/or corporate setups, for generating numerous messages to multiple addresses, for instance for the clientele, employees personnel or subscribers to an information service, social network, any type of client service and alike. Electronic messages generated by message generator 126 are transmitted to MPMA 124.

Optionally sender moiety 112 comprises MPMA 124. MPMA 124 receives incoming messages from IMPUA 120 or generator 126 and applies a pre-modification thereto. The pre-modification applied by MPMA 124 is mutatis mutandis essentially similar to the pre-modification applied by MPMA 24, described in more detail supra. The code of the pre-modification parameters embedded in predefined field of an XML or HTML structured form is typically hidden from the view of the recipient. The code of the pre-modification parameters is utilized by a MMA, which include sender, recipient and/or transfer MMAs. Data/files necessary for the modification of the message are typically either included with the message or obtainable from an IP address, URI and/or URL.

The pre-modified message, containing pre-modification parameters, is transmitted to SMMA 125 or to IM/PRESENCE server 134 (hereinafter IM/PRSN).

Configuration 6

Alternatively or additionally sender moiety 112 of system 100 comprises SMMA 125. SMMA 125 receives incoming messages from IMPUA 120, generator 126 or MPMA 124 and applies a modification hereto. The modification of the messages by SMMA 125 is mutatis mutandis essentially similar to the modification applied by SMMA 25, described in more detail supra. The modification of the messages by SMMA 125 is performed by modifying a constituent of the message intended for the recipient. The modification of the messages by SMMA 125 is performed in accordance with at least one modification parameter of the recipient, represented by the UID thereof, retrieved from database 60. The modification of the messages by SMMA 125 is optionally performed inter alia in accordance with pre-modification parameters prescribed by MPMA 124.

IM/PRSN 134 contains updated data about the recipient moieties 114A to 114C. Partially, these data are essentially similar to the modification parameters contained in database 60. Therefore, alternatively or additionally, modification of the messages by SMMA 125 is performed in accordance with modification parameters/data retrieved directly from IM/PRSN 134. Database 60 can be integrated with IM/PRSN 134 in module 138 or form an independent constituent of system 100.

In some embodiments, updated data from IM/PRSN 134 is retrieved by or pushed to DBMS of database 60, which coverts these data into an updated set of modification parameters and subsequently stores these parameters in database 60. The update of modification parameters from IM/PRSN 134 is preferably prompted upon an initiation of a session with a recipient moiety, such as moieties 114A to 114C. Modification of messages in accordance with modification parameters derived from the data obtained from IM/PRSN 134, either directly or via storage at database 60 is hereinafter referred to as modification of the fifth type.

Configuration 7

In some embodiments system 100 comprises TMMA 136. TMMA 136 modifies messages incoming into IM/PRSN 134. The modification of the messages by TMMA 136 is performed in accordance with at least one modification parameter of the recipient, represented by the UID thereof, retrieved from database 60 and/or IM/PRSN 134. TMMA 136 is optionally integrated with IM/PRSN 134 and/or database 60 into module 38 or forms an independent constituent of system 100. Database 60 optionally forms an independent constituent of system 100. Messages incoming into IM/PRSN 134 are typically transferred to TMMA 136, modified therein, and subsequently returned to IM/PRSN 134. If a message is intended to a recipient, represented by the UID thereof, running multiple recipient IMPUAs, such as IMPUAs 152A to 152C, the updated profile data about recipient IMPUAs is used for the creation of the respective number of copies therefor, i.e. plural modification, which are then returned to IM/PRSN 134 and transmitted to IMPUAs 152A to 152C in recipient moieties 114A to 114C.

In other embodiments the messages incoming into IM/PRSN 134 are transferred to TMMA 136, modified therein, and subsequently relayed directly to IMPUAs 152A to 152C in recipient moieties 114A to 114C. If a message is intended for a recipient, represented by the UID thereof, running multiple recipient IMPUAs, such as IMPUAs 152A to 152C, the UID is preferably employed for the construction of a dynamic composite entry of modification parameters for each particular IMPUA, which are further used for modifying respectively the copy addressed to that particular IMPUA, i.e. temporal singular modification. The copy modified by TMMA 136 is then transmitted to IMPUAs 152A to 152C. TMMA 136 in such instance is furnished with message relaying capabilities for transmitting the message to recipient moieties 114A to 114C.

Configuration 8

In some embodiments system 100 comprises RMMA, such as RMMAs 146A to 146C. RMMAs 146A to 146C modify messages respectively incoming into recipient moieties 114A to 114C. The modification of the messages by RMMAs 146A to 146C is typically performed either in accordance with modification parameters, retrieved from database 60 and/or IM/PRSN 134. In other embodiments the modification of the messages by RMMAs 146A to 146C is performed or in accordance with modification parameters obtained from the machines operable in running IMPUAs 152A to 152C. If the modification is performed in accordance with modification parameters available on the machines of IMPUAs 152A to 152C, RMMAs 146A to 146C are typically provided by pre-modification parameters. Pre-modification parameters can be provided by MPMA 124 and/or TMMA 136, which in the latter instance acts as a MPMA.

Configuration 9

In accordance with some embodiments of the present invention, reference is now made to FIG. 2B, showing electronic messages modifying system 200. System 200 comprises sender moiety 112 and recipient moieties 114A and 114B. Sender moiety 112 is typically connected to recipient moieties 114A to 114C through computer network 16. Sender moiety 112 comprises sending terminal IMPUA 120 or message generator 126 implemented for generating numerous electronic messages. Sender moiety 112 may further include MPMA 124 for applying a pre-modification to the messages originating from IMPUA 120 or generator 126, substantially as described hereinabove.

System 200 comprises IM/PRSN 134A, receiving incoming messages from IMPUA 120 and/or generator 126 in sender moiety 112 and handles these messages essentially as known in the art, for instance as specified by OMA-IMPS, OMA-PAG, OMA-MWG, XMPP and/or SIMPLE standards' collections, referred to supra. IM/PRSN 134A server is optionally integrated with SMMA 125 in module 138A. In some embodiments MPMA 124 is operable in sender moiety 112; whereas in other embodiments MPMA (not shown) is operable in or integrated with SMMA 125 and/or IM/PRSN 134A in module 138A.

Database 60A optionally contains pre-modification parameters. In some embodiments database 60A is integrated with IM/PRSN 134A and/or SMMA 125 in module 138A. In others embodiments, database 60A forms an independent constituent of system 200. In yet others embodiments SMMA 125 retrieves modification parameters from databases 60B and/or 60C. Database 60 is updated in accordance with methods disclosed hereinabove and/or from IM/PRSN 134A.

IM/PRSN 134A typically transfers incoming messages to SMMA 125 or MPMA (not shown) in module 138A. The pre-modification and/or modification of the messages respectively by MPMA (not shown) and/or SMMA 125 is performed, substantially as described hereinabove. The modification of the messages by SMMA 125 is typically performed in accordance with at least one modification parameter of the recipient, represented by the UID thereof, retrieved from database 60A and/or in accordance with pre-modification parameters prescribed by MPMA 124 in moiety 112 and/or MPMA (not shown) in module 138A. The modification of the messages by SMMA 125 is optionally performed in accordance with modification parameters derived from the data obtained from IM/PRSN 134A, either directly or via storage at database 60A, i.e. modification of the fifth type.

After being pre-modified and/or modified by MPMA (not shown) in module 138A and/or SMMA 125, the messages are typically either directly transmitted therefrom or returned IM/PRSN 134A and thereafter transmitted to the recipient moiety/moieties, such as moieties 114A to 114B, or to instant messaging and/or presence relay 140 (henceforth IM/PRSN RLY); in the former instance MPMA (not shown) in module 138A and/or SMMA 125 is furnished with message relaying capabilities for transmitting the messages.

Configuration 10

In some embodiments system 200 comprises TMMA 136. In some instances MPMA (not shown) in module 138A. and/or SMMA 125 and/or IM/PRSN 134A, are configured to send the messages directly to IM/PRSN RLY 140; whereas in other embodiments messages directed to the recipient moiety/moieties, such as moieties 114A to 114B, are intercepted and delivered to IM/PRSN RLY 140, by a mechanism similar to the MX record exchange, described in more detail at the context of system 100. Particular examples of such an intercepting mechanism include ENUM servers, operation of which is inter alia standardized in RFC 3761, RFC 3762, RFC 3764, RFC4725.

After receiving incoming messages, IM/PRSN RLY 140 transfers these messages to TMMA 136. TMMA 136 modifies the received messages in accordance with at least one modification parameter, retrieved from database 60B, essentially as described supra. TMMA 136 is optionally integrated with IM/PRSN RLY 140 and/or database 60B into module 138B or forms an independent constituent of system 200; database 60 optionally also forms an independent constituent of system 200. Database 60 is updated in accordance with methods disclosed hereinabove and/or from IM/PRSN 134A and/or IM/PRSN 134B. The data from IM/PRSN 134A and/or IM/PRSN 134B is typically either pushed to the DBMS of database 60B by IM/PRSN 134A and/or IM/PRSN 134B or retrieved by the DBMS therefrom. Some instances triggering an update of database 60B by pushing data from IM/PRSN 134A and/or IM/PRSN 134B thereto include initiation of a session with an IMPUA, such as IMPUAs 152A to 152B in moieties 114A to 114B, and/or resumption of active status thereof. Database 60B is optionally updated from databases 60A and/or 60C.

If a message is intended for a recipient, represented by the UID thereof, currently running multiple recipient IMPUAs, such as IMPUAs 152A to 152B, the updated profile data from IM/PRSN 134A and typically from IM/PRSN 134B about recipient IMPUAs is used for the creation of the respective number of copies therefor, i.e. plural modification, which are then returned to IM/PRSN RLY 140 and then transmitted to IMPUAs 152A to 152B in recipient moieties 114A to 114B.

In other embodiments if a message is intended for a recipient, represented by the UID thereof, currently running multiple recipient IMPUAs, such as IMPUAs 152A to 152B, the UID is preferably employed for the construction of a dynamic composite entry of modification parameters for each particular recipient IMPUA, which are further used for modifying respectively the copy addressed to that particular IMPUA, i.e. temporal singular modification. The copy modified by TMMA 136 is then transmitted to IMPUAs 152A to 152B directly or returned to IM/PRSN RLY 140 and the transmitted therefrom; TMMA 136 in the former instance is hence furnished with message relaying capabilities for transmitting the message to recipient moieties 114A to 114B.

Configuration 11

In some embodiments sender moiety 112 and recipient moieties, such as moieties 114A and 114B, of system 200 are implemented on different platforms, for instance Twitter®, Skype®, Windows Live®, Facebook® or Google Talk®. In such a case, system 200 comprises at least one gateway, such as gateways GTWY 170A and GTWY 170B. GTWY 170A and GTWY 170B acts an IM/PRSN relay, capable of converting the message to a format compatible with IMPUA and/or IM/PRSN of the recipient platform; essentially as known in the art; exemplarily references to GTWY include XMPP-CORE-01, SIP-XMPP-IM-01, SIP-XMPP-CHAT-03, XMPP-PRESENCE-02. GTWY 170A and GTWY 170B are connected via interconnect link 172 or internet 16.

After converting, GTWY 170A and/or GTWY 170B transmit the messages to IM/PRSN 134B. IM/PRSN 134B is typically configured similarly to IM/PRSN 134A. IM/PRSN 134B contains updated profile data about recipient IMPUAs, such as IMPUAs 152A to 152B, in recipient moieties 114A to 114B. IM/PRSN 134B is optionally integrated with RMMA 146 in module 138B. In some embodiments database 60C is integrated with IM/PRSN 134B and/or RMMA 146 in module 138A. In others embodiments, database 60C forms an independent constituent of system 200. In yet others embodiments RMMA 146 retrieves modification parameters from databases 60A and/or 60B. Database 60C is updated in accordance with methods disclosed hereinabove and/or from IM/PRSN 134B.

IM/PRSN 134B typically transfers incoming messages to RMMA 146. The modification of the messages by RMMA 146 is performed, substantially as described hereinabove. The modification of the messages by RMMA 146 is typically performed in accordance with at least one modification parameter of the UID, retrieved from database 60C and/or in accordance with pre-modification parameters prescribed by MPMA 124 in moiety 112 and/or MPMA (not shown) in module 138A. The modification of the messages by RMMA 146 is optionally performed in accordance with modification parameters derived from the data associated with given UI obtained from IM/PRSN 134C, either directly or via storage at database 60C, i.e. modification of the fifth type.

After being modified by RMMA 146, the messages are typically either directly relayed therefrom or returned IM/PRSN 134B and thereafter transmitted to recipient IMPUAs, such as IMPUAs 152A to 152B in moieties 114A to 114B; in the former instance RMMA 146 is furnished with message relaying capabilities for transmitting the messages to recipient IMPUAs.

The modification of the messages by RMMA 146 is optionally performed in accordance with at least one pre-modification parameter prescribed by MPMA 124 in moiety 112 and/or MPMA (not shown) in module 138A. Sender moiety 112, module 138A and/or module 138B incorporate SMMA 125 and/or TMMA 136 may act as an MPMA; whereas database 60A and/or 60B optionally contain pre-modification parameters.

In some embodiments the messages are intercepted on their way from IM/PRSN 134A to GTWY 170A and/or GTWY 170A to GTWY 170B and/or GTWY 170B to IM/PRSN 134A or otherwise delivered to IM/PRSN RLY 140 and the modification is performed by TMMA 136, essentially as described hereinabove. In some embodiments TMMA 136 and/or module 138B are integrated with GTWY 170A to GTWY 170B.

Configuration 12

Commonly, in the art, sender IMPUA and recipient IMPUA/s are implemented on the same platform, for instance Twitter®, Skype®, Windows Live®, Facebook® or Google Talk®. Therefore, in some preferred embodiments sender moiety 112 and recipient moieties, such as moieties 114A and 114B, of system 200 are implemented on a unitary proprietary platform. In such a case, system 200 typically comprises merely a single IM/PRSN server (not shown) and does not include GTWY 170A and GTWY 170B, somewhat similar to the configuration depicted in FIG. 2A but wherein the modification is performed on the IM/PRSN level.

Accordingly, in such configurations, IM/PRSN 134A and IM/PRSN 134B are the very same constituent of system 200

(not shown). Moreover in such configurations, SMMA 125 and RMMA 146 are the very same constituent of system 200 (not shown), which are optionally integrated with the single IM/PRSN (not shown) into a module, such as module 138A or 138B.

System 200 typically comprises a single database, such as database 60A or 60C, integrated with the single IM/PRSN (not shown) and/or a single MMA (not shown), performing the function of SMMA 125 and RMMA 146, depending on the direction the message is sent to. In some instances an external database, such as database 60B, is used for the storage of modification parameters and the single MMA (not shown), performing the functions of SMMA 125 and RMMA 146, retrieves the modification parameters therefrom. If sender/recipient employs multiple IMPUAs, the modification performed by the single MMA can be a plural or a temporal singular modification. The modification by the single MMA is preferably performed in accordance with modification parameters derived from the data obtained from the single IM/PRSN (not shown) of system 200.

Configuration 13

In some embodiments of the present invention, the electronic messages modifying system is dedicated for modification of presence messaging. Presence protocols are standardized, inter alia, in OMA-IMPS, OMA-PAG, XMPP and/or SIMPLE standards' collections, referred to supra and/or proprietary protocols. In such embodiments the following terminology is commonly used in the art in lieu of foregoing:

IMPUA and IM/PRSN—PUA and PRSN, respectively;
sender—presentity;
recipient—watcher;
sending message—publishing;
receiving message via pull step—fetching;
receiving message via push step—notifying.

Characteristics of presence messaging systems as oppose to IM systems typically include: a) frequent publishing of one or more presence attributes by the presentity, b) usually a plurality of watchers, whom are typically subscribed or associated with the presentity, and c) obtainment of the messages by watchers, whom are not subscribed or associated with the presentity, inter alia via fetching step; whereas in IM the messages are typically delivered to the recipient via push step.

Therefore, in embodiments dedicated for modification of presence messages, in addition to the modifications of either of the five types defined hereinabove, optionally a modification of the message in accordance with the recent or last presence attribute/s as provided by and/or associated with the presentity is performed, henceforth referred to as the modification of the sixth type. One type of a presence attribute is often colloquially referred to as status. Modification of the sixth type optionally includes avoidance from modification of the message, modification essentially as described hereinabove, and/or precluding notifying to and/or fetching of the message by a particular watcher and/or a group of watchers. Database of modification parameters (not shown) is optionally updated from/by the PRSN of the watcher.

In some instances, the presence attribute/s of the presentity is/are utilized for deriving therefrom pre-modification parameters. In such instances, the MPMA (not shown) retrieves the presence attribute/s of the presentity from the presentity PRSN. Optionally the MPMA (not shown) is integrated with the PRSN of the presentity. Database of pre-modification parameters (not shown) is optionally updated from/by the PRSN of the presentity.

Typically watchers that are subscribed to or associated with the presentity receive the message via a notification step. If a watcher, as established by the UID thereof, employs multiple recipient IMPUAs, such as IMPUAs 152A to 152B in moieties 114A to 114B, typically a plural modification is applied to the message, as elaborated supra. Watchers that are neither subscribed to nor associated with the presentity typically receive the message via fetching step. If a watcher, as established by the UID thereof, neither subscribed to nor associated with the presentity, employs multiple recipient IMPUAs, such as IMPUAs 152A to 152B in moieties 114A to 114B, typically a singular temporal modification is applied to the message, as described hereinabove.

Configuration 14

In some embodiments of the present invention, the electronic messages modifying system is dedicated chiefly to the modification of electronic mail and presence messaging, in such a manner that a particular source or a group of sources is selected from a plurality of sources for the given information; whereby an electronic mail or presence message is modified in accordance with at least one modification parameter and/or presence attribute of the recipient/watcher UID, in combination with properties of the recipient/watcher MUA, IMPUA or PUA machine, qualities/characteristics of the service provided by the network operator and/or qualities/characteristics of external service providers.

For example A, B, C and D are recipients/watchers of a sender/presentity, which is an information service, such as a financial alert service sender/presentity, scientific articles sender/presentity or news service sender/presentity. In one instance, information service lists numerous articles for a single informational subject, available from different sources; thus topical economic issues are typically provided independently by several different financial newspapers. The information service, e.g. Google News, associates the articles from several different sources (X, Y and Z) as pertaining to the same topical issue; thereby allowing the users to opt a preferred source for a given topical issue. In another instance, a scientific article or a patent cites several other reference articles, whereas the information service, e.g. a scientific articles portal, such as PubMed, associates the reference articles, possibly from different sources (X, Y and Z), as cited in a given scientific article. A characteristic of both examples is that a single informational subject, such as a topical economic issue or scientific article, is associated with several other articles, respectively, such as articles or cited references from several different sources.

Continuing the example above, recipient/watcher A is registered to source X and recipient/watcher B is registered to source Y. Recipient/watcher C is registered to sources X and Y (having a computer program compatible with source X installed on device 1 and computer program compatible with source Y installed on device 2), whereas recipient/watcher D is not registered to neither of the sources X, Y or Z but frequently uses a free of charge online sources. Sources X and Y require paid registration, whereas source Z provides a free of charge news service.

Upon a publication of a new article by sources X, Y and Z associated with the financial alert service sender/presentity, the MMA optionally modifies that message in the following manner: recipient/watcher A will receive a link for the article provided by source X; recipient/watcher B will receive a link for the article provided by source Y; recipient/watcher C will receive a link for the article provided by source X to device 1 and a another link for the informational subject provided by source Y installed to device 2; whereas recipient/watcher D will not receive the message at all or receive a message with a link to the article provided by source Z.

According to the other example, upon a publication of a new scientific article citing references available from sources X, Y and Z associated with the scientific articles sender/presentity, the MMA optionally modifies that message in the following manner: recipient/watcher A will receive a message with notification regarding the new scientific article with a link for the cited reference available from source X and Z, as well as an invitation to register to source Y; recipient/watcher B will receive a message with notification regarding the new scientific article with a link for the cited references available from source Y and Z, well as an invitation to register to source X; recipient/watcher C will receive a message with notification regarding the new scientific article with a link for the cited references available from source X, Y and Z; whereas recipient/watcher D will not receive a message regarding the new scientific article at all or receive such a message with a link for the cited reference available from source Z and an invitation to register to sources X and Y.

In other instances the MPMA of the information service sender/presentity sets pre-modification parameters in the message, according to which if MMA determines that a particular recipient/watcher is registered to a given source, such a recipient/watcher will receive a notification and/or a link to the article available from said source; whereas if MMA determines that a particular recipient/watcher is not registered to a given source, such a recipient/watcher will not receive a notification at all and/or will receive a message with an invitation to register to said source and/or will receive a message merely with links to sources that provide a free of charge service and/or will receive the message merely if at least one free of charge sources is associated with the informational subject.

It will be appreciated by persons skilled in the art that the present invention is not limited by what has been particularly shown and described herein above. Thus the modification of electronic messages in accordance with various embodiments of the present invention is performable by either of SMMA 25, TMMA 36 RMMA 46, SMMA 125, TMMA 136, RMMA 146 as well as by any combination thereof. Moreover, the pre-modification parameters set by MPMA 24, MPMA 124 in moiety 112 and/or MPMA (not shown) in module 138A, can be utilized in modification by either of SMMA 25, TMMA 36 RMMA 46, SMMA 125, TMMA 136 and/or RMMA 146 as well as by any combination thereof, as a modification of the first type.

It is further emphasized that various embodiments and/or configurations of the method/system of the present invention are typically furnished with backward compatibility support. Thus a message for which modification cannot be established or fails for any reason whatsoever is optionally not modified but rather forwarded by SMMA 25, TMMA 36, RMMA 46, SMMA 125, TMMA 136, and/or RMMA 146. Furthermore if solely modification parameters of particular category/categories are established for a given message, the message is merely partially modified in a respective manner. Moreover, similar modification parameters from different categories are preferably assigned with a priority order; for instance the modification parameter associated with UID, such as parameters from the fourth category, e.g. indicative of the service the recipient is typically registered to assigned with a preeminent priority order and overrules the modification parameter indicative of the services the recipient is registered to from any other category.

It is ultimately noted that SMMA 25, TMMA 36, RMMA 46, SMMA 125, TMMA 136 and/or RMMA 146 are optionally store and manage the retrieved records of modification parameters in a local manner. Thus if modification parameters cannot be established for a given message, the set of modification parameters used for the previous modification can be used. Modification parameters stored and managed as records by SMMA 25, TMMA 36, RMMA 46, SMMA 125, TMMA 136 and/or RMMA 146 can be assigned with an expiration date and/or time.

Moreover if modification parameters cannot be established for a given message and/or a conditional action prescribed by a pre-modification parameter dictates so and/or established modification parameter dictates so, optionally, no modification is performed on the message and/or further transmitting of the message and/or delivery thereof to the recipient is not performed.

The constituent of internet denoted in the drawings and specification hereinabove is not to be construed as an exclusive or sole internet connection, rather the internet is denoted due to the functional meaning thereof, e.g. entailing resolving with the DNS the destination IP address of an MX record, SRV record, etc. It is further elucidated that all and any of the line connectors in the drawings are in a non-limiting manner indicate connections via internet, proxy configuration, direct cable connection and/or integration.

It should be acknowledged that the access to the database containing the modification parameters, such as databases 60, 60A, 60B or 60C, in FIG. 1 to 2B, is typically assigned with permissions and/or certification levels. Permissions are typically set by the DBMS and or from terminal interface, such as terminal interface 64, dedicated ad hoc inputting user profile properties and/or preferences. Permissions are typically assigned as for sources updating the database as well as MMAs, such as SMMA 25, TMMA 36 RMMA 46, SMMA 125, TMMA 136 and/or RMMA 146, retrieving data therefrom.

It is stressed that in the sake of brevity not all actual combinations of modules, agents and/or various other constituents from different configurations and/or embodiments are explicitly disclosed in the specification hereinabove. The emphasis instead has been made on the characteristics of such constituents and functional context thereof. Therefore numerous non-disclosed combinations of modules, agents and/or various other constituents from different configurations and/or embodiments are contemplated by the present disclosure. In some instances a cross-connectivity between a moiety of IM and/or presence with moiety/moieties of E-mail configuration/s is envisaged.

The invention claimed is:

1. An electronic message modifying system, said system comprises:
   [a] at least one computer data storage medium having stored therein at least one modification parameters database, said database contains a plurality of modification parameters allocated in respective sub-entries; wherein modification parameters from different sub-entries are combinable in a single entry selected from the group consisting of: a static entry and dynamic entry;
   [b] at least one first computer, comprising at least one micro-processor, operable as:
      [1] at least one member selected from the group consisting of:
         a sending terminal, used for the composition of an electronic message and formatting thereof, and a message generator, implemented for generating numerous electronic messages in a short period of time;

[2] a message pre-modification agent, said pre-modification agent receives an incoming message from said sending terminal and/or from said message generator and prescribes at least one pre-modification parameter thereto, wherein said pre-modification parameter is a conditional action performed upon meeting a predefined criterion;

[c] at least one second computer, comprising at least one micro-processor operable as a message user agent, configured to receive modified messages and present said modified messages to said recipient;

[d] at least one computer, comprising at least one microprocessor, selected from the group consisting of: said first computer, said second computer and a third computer, operable as at least one message modification agent, receiving incoming messages from at least one member selected from the group consisting of: said sending terminal, said message generator and said message pre-modification agent, said message modification agent is configured to retrieve an updated set of said modifications parameters from said database and subject said incoming messages to a modification; wherein said modification comprises modifying at least one constituent of a message intended for said recipient, wherein said modification is erformed in accordance with at least one member selected from the group consisting of:

[1] a modification parameter retrieved from said database;

[2] a pre-modification parameters prescribed by said pre-modification agent;

wherein said modification parameters in said database are dynamically updated upon at least one event selected from the group consisting of: a process actively initiated by a machine associated with said recipient message user agent, a process actively initiated by a provider of communication services for a machine associated with said recipient message user agent, a process actively initiated by a database-management-system of said database and a process initiated by a service provider other than said provider of communication services;

wherein said system is not implementable for defense from spam or unsolicited messages;

wherein said modification parameters in said database are not updated by the recipient himself/herself; and wherein said modification parameters are unrelated to characteristics of said message.

2. The electronic message modifying system as set forth in claim 1, wherein said constituent is selected from the group consisting of: text, alphanumeric data, audio files, video files, graphics and hyperlink/s.

3. The electronic message modifying system as set forth in claim 1, wherein said message modification agent is selected from the group consisting of: a sender message modification agent, transfer message modification agent and recipient message modification agent.

4. The electronic message modifying system as set forth in claim 1, wherein said modification parameters utilized by said sender message modification agent refer to relatively constant and/or static qualities/characteristics, which are less prone to change during a time period said message is delivered to said recipient.

5. The electronic message modifying system as set forth in claim 1, wherein said modification parameters in said database pertain to said machine associated with said recipient message user agent.

6. The electronic message modifying system as set forth in claim 5, wherein said modification parameters in said database, comprising at least one modification parameter selected from the group consisting of: a type and/or model of hardware components of said machine associated with said recipient message user agent; a configuration of said hardware components of said machine associated with said recipient message user agent; a state and/or capacity of at least one of said hardware components; a type and/or model of the firmware installed in a memory of said machine associated with said recipient message user agent; dynamic properties of said machine associated with said recipient message user agent; a type and/or model of the operating system running on said machine associated with said recipient message user agent; a list of software applications operable on said machine associated with said recipient message user agent; a list of content accessible by said machine associated with said recipient message user agent, and preferences and/or configurations of software components of said machine associated with said recipient message user agent.

7. The electronic message modifying system as set forth in claim 1, wherein said modification parameters in said database pertain to said service provider of network communication for said recipient message user agent.

8. The electronic message modifying system as set forth in claim 1, wherein said pre-modification parameters are embedded in a header and/or body of said message.

9. The electronic message modifying system as set forth in claim 7, wherein said modification parameters in said database pertain to said service provider of network communication for said recipient message user agent, comprising at least one modification parameter selected from the group consisting of: ambient conditions; a strength and/or availability of the cellular network signal; geographical locations and/or present time; availability and/or the bandwidth of network connection; types of services said recipient is subscribed to and customer profile data of said recipient.

10. The electronic message modifying system as set forth in claim 1, wherein said modification parameters in said database pertain to user profile properties of said recipient.

11. The electronic message modifying system as set forth in claim 10, wherein said modification parameters in said database pertain to user profile properties of said recipient, comprising at least one modification parameter selected from the group consisting of: parameters associated with a particular messaging account, parameters associated with a particular person; parameters associated with a particular entity; parameters establishing a unique identity of said recipient; parameters associated with personal information of said recipient, gender of said recipient, age of said recipient, wearing glasses by said recipient, hearing impairment of said recipient, other disabilities of said recipient, marital status of said recipient, hometown of said recipient, language preference of said recipient, preferences specified for the messaging account of said recipient; message box quota and/or current available size at the messaging account of said recipient, last time and device accessed the messaging account of said recipient, information related to devices used to access the messaging account of said recipient; information related to analysis performed by the messaging account manager of the messaging account of said recipient.

12. The electronic message modifying system as set forth in claim 1, wherein said modification parameters in said database provided by external service providers.

13. The electronic message modifying system as set forth in claim 12, wherein said modification parameters in said database provided by external service providers, comprising at least one modification parameter selected from the group consisting of: parameters associated with information services, parameters associated with subscription services, parameters associated with social networks; parameters associated with consumer services of said recipient; parameters associated with message address; parameters associated with credentials of said recipient, parameters related to a unique ID of said service provider; parameters related to logical IP address of said machine associated with said recipient message user agent; parameters related to MEI address of said machine associated with said recipient message user agent; parameters related to MAC address of said machine associated with said recipient message user agent; browsing and/or usage patterns and/or history associated with said recipient; contact list and/or social graph associated with said recipient; device currently used and/or devices used before by said recipient; advertisement consumed on a particular service; purchase history of said recipient; available credit of said recipient; preferences specified by said recipient.

14. The electronic message modifying system as set forth in claim 1, wherein said modification parameters in said database are provided by an appliance.

15. The electronic message modifying system as set forth in claim 14, wherein said appliance is an inventory system, capable of monitoring an amount and/or condition of goods stored therein.

16. The electronic message modifying system as set forth in claim 1, wherein said sender moiety further comprises at least one message agent selected from the group consisting of: a message transfer agent and message submission agent.

17. The electronic message modifying system as set forth in claim 1, wherein said recipient moiety further comprises at least one member selected from the group consisting of: a message transfer agent, message delivery agent and retrieval agent.

18. The electronic message modifying system as set forth in claim 1, wherein said modification is a modification of a first type, performed in accordance with pre-modification parameters prescribed by said message pre-modification agent, upon at least one selected from the group consisting of: receipt of an incoming message by said message transfer agent in said recipient moiety; receipt of an incoming message by said recipient message modification agent; an access and/or retrieval of a message by said message user agent in said recipient moiety.

19. The electronic message modifying system as set forth in claim 1, wherein said modification performed by said at least one message modification agent is a temporal singular modification.

20. The electronic message modifying system as set forth in claim 1, wherein said modification is a modification of a second type, performed upon at least one event selected from the group consisting of: receipt of an incoming message by said message transfer agent in said recipient moiety, and receipt of an incoming message by said recipient message modification agent; wherein said modification of the second type is associated with modification parameters retrieved from said database a retrieval of a first type.

21. The electronic message modifying system as set forth in claim 1, wherein said modification is a modification of a third type, performed upon at least one member selected from the group consisting of: access to, retrieval by and pushing of an incoming message by said message user agent in said recipient moiety; wherein said modification of the third type is associated with modification parameters retrieved from said database a retrieval of a second type.

22. The electronic message modifying system as set forth in claim 1, wherein said modification is a modification of a fourth type, performed in accordance with modification parameters other than these retrieved from said database.

23. The electronic message modifying system as set forth in claim 1, wherein said message user agent is an instant messaging/presence user agent.

24. The electronic message modifying system as set forth in claim 1, wherein said system further comprises an instant messaging/presence server.

25. The electronic message modifying system as set forth in claim 24, wherein said instant messaging/presence server is associated with said transfer message modification agent.

26. The electronic message modifying system as set forth in claim 24, wherein said dynamic update of said modification parameters in said database is performed from said instant messaging/presence server.

27. The electronic message modifying system as set forth in claim 26, wherein said dynamic update of said modification parameters in said database is performed by pushing into said database updated modification parameters from said instant messaging/presence server.

28. The electronic message modifying system as set forth in claim 27, wherein said modification parameters are retrieved by said at least one modification agent from at least one source selected from the group consisting of: said database, said instant messaging/presence server, said machine associated with said recipient message user agent.

29. The electronic message modifying system as set forth in claim 27, wherein said machine associated with said recipient message user agent is associated with a plurality of recipient message user agents appurtenant to different unique identities (UIDs).

30. The electronic message modifying system as set forth in claim 1, wherein said modification is a modification of a sixth type, comprising modifying said message in accordance with at least one attribute associated with a watcher.

31. The electronic message modifying system as set forth in claim 24, wherein said instant messaging/presence server performs a multiple distribution of singularly modified messages to a plurality of watchers.

32. The electronic message modifying system as set forth in claim 27, wherein said dynamic update of said modification parameters in said database is performed by said database-management-system of said database, which retrieves updated modification parameters from said instant messaging/presence server.

33. The electronic message modifying system as set forth in claim 27, wherein said dynamic update of said modification parameters in said database is performed prompted upon an initiation of a session with said recipient moiety.

34. The electronic message modifying system as set forth in claim 1, wherein said system further comprises an instant messaging and/or presence relay.

35. The electronic message modifying system as set forth in claim 34, wherein said sender moiety and at least one of said recipient moieties are implemented on different platforms, whereas said system comprises at least one gateway, which acts as an instant messaging and/or presence relay, capable of converting a message to a format compatible with the platform of said at least one of said recipient moieties.

36. The electronic message modifying system as set forth in claim 1, wherein said recipient moiety is a plurality of recipient moieties associated with a singular unique identity (UID).

37. The electronic message modifying system as set forth in claim 36, wherein said unique identity (LAD) is associated with at least one selected from the group consisting of: a messaging account, e-mail address, account associated with an individual person, a profile entity associated with an individual person, a username at a specific domain, a username for an account which is an email address.

38. The electronic message modifying system as set forth in claim 36, wherein said recipient moiety is a plurality of recipient moieties associated with a singular unique identity (UID), and wherein said modification is performed in accordance with modification parameters allocated within said database in at least one composite entry, comprising a plurality of sub-entries representing associated with said singular unique identity (UID).

39. The electronic message modifying system as set forth in claim 1, wherein said modification is performed on the IM/PRSN level.

40. The electronic message modifying system as set forth in claim 1, wherein said system is dedicated for modification of presence messaging.

41. The electronic message modifying system as set forth in claim 1, wherein at least one of said message modification agents stores and manages retrieved records of said modification parameters in a local manner.

42. An electronic message modifying system, said system comprises:
[a] at least one computer data storage medium having stored therein at least one modification parameters database, said database contains a plurality of modification parameters allocated in respective sub-entries wherein modification parameters from different sub-entries are combinable in a single entry selected from the group consisting of: a static entry and dynamic entry;
[b] at least one first computer, comprising at least one micro-processor, operable as at least one member selected from the group consisting of:
 [1] a sending terminal, used for composition of an electronic message and formatting thereof, and
 [2] a message generator, implemented for generating numerous electronic messages in a short period of time;
[c] at least one second computer, comprising at least one micro-processor, operable as a message user agent, configured to receive modified messages and present said modified messages for view of said recipient;
[d] at least one computer, comprising at least one microprocessor, selected from the group consisting of: said first computer, said second computer and a third computer, operable as at least one message modification agent, receiving incoming messages from at least one member selected from the group consisting of: said sending terminal, said message generator and said message pre-modification agent, said message modification agent is configured to retrieve an updated set of said modifications parameters from said database and subject said incoming messages to a modification; wherein said modification comprises modifying at least one constituent of a message intended for said recipient: wherein said modification is performed in accordance with at least one modification parameter retrieved from said database;
wherein said modification parameters in said database are dynamically updated by at least one member selected from the group consisting of: a machine associated with said recipient message user agent, a database-management-system of said database;
wherein said system is not implementable for defense from spam or unsolicited messages;
wherein said modification parameters in said database are not updated by the recipient himself/herself; and
wherein said modification parameters are unrelated to a characteristics of said message.

43. The electronic message modifying system as set forth in claim 42, wherein said system further comprises a message pre-modification agent in said sender moiety, said pre-modification agent receives an incoming message from and prescribes at least one pre-modification parameter thereto, wherein said pre-modification parameter is a conditional action performed upon meeting a predefined criterion; and wherein said modification is performed in accordance with at least one pre-modification parameters prescribed by said pre-modification agent.

44. The electronic message modifying system as set forth in claim 42, wherein said constituent is selected from the group consisting of: text, alphanumeric data, audio files, video files, graphics and hyperlink/s.

45. The electronic message modifying system as set forth in claim 42, wherein a datum/file necessary for said modification is selected from the group consisting of: a datum/file contained within attachments of said message, datum/file obtainable from an IP address, datum/file obtainable from an URI and/or datum/file obtainable from an URL.

46. The electronic message modifying system as set forth in claim 43, wherein said pre-modification parameters are embedded in a header and/or body of said message.

47. The electronic message modifying system as set forth in claim 42, wherein said dynamic update is performed upon at least one event selected from the group consisting of: a process actively initiated by said machine associated with said recipient message user agent, a process actively initiated by a provider of communication services for a machine associated with said recipient message user agent, a process actively initiated by said database-management-system of said database and a process initiated by a service provider other than said provider of communication services, a process actively initiated in accordance with a predefined schedule.

48. The electronic message modifying system as set forth in claim 42, wherein a plurality of said modification parameters contained in said database are allocated in respective sub-entries; wherein modification parameters from different sub-entries are combinable in a single entry selected from the group consisting of: a static entry and dynamic entry.

49. The electronic message modifying system as set forth in claim 42, wherein said message modification agent is selected from the group consisting of: a sender message modification agent, transfer message modification agent and recipient message modification agent.

50. The electronic message modifying system as set forth in claim 42, wherein said modification parameters utilized by said sender message modification agent refer to relatively constant and/or static qualities/characteristics, which are less prone to change during a time period said message is delivered to said recipient.

51. The electronic message modifying system as set forth in claim 42, wherein said modification parameters in said database pertain to said machine associated with said recipient message user agent.

52. The electronic message modifying system as set forth in claim 51, wherein said modification parameters in said database pertain to said machine associated with said recipient message user agent, comprising at least one modification parameter selected from the group consisting of: a type and/or model of hardware components of said machine associated with said recipient message user agent; a configuration of said hardware components of said machine associated with said recipient message user agent; a state and/or capacity of at least one of said hardware components; a type and/or model of the firmware installed in a memory of said machine associated with said recipient message user agent; dynamic properties of said machine associated with said recipient message user agent; a type and/or model of the operating system running on said machine associated with said recipient message user agent; a list of software applications operable on said machine associated with said recipient message user agent; a list of content accessible by said machine associated with said recipient message user agent, and preferences and/or configurations of software components of said machine associated with said recipient message user agent.

53. The electronic message modifying system as set forth in claim 42, wherein said modification parameters in said database pertain to said service provider of network communication for said recipient message user agent.

54. The electronic message modifying system as set forth in claim 53, wherein said modification parameters in said database pertain to said service provider of network communication for said recipient message user agent, comprising at least one modification parameter selected from the group consisting of: ambient conditions; a strength and/or availability of the cellular network signal; geographical locations and/or present time; availability and/or the bandwidth of network connection; types of services said recipient is subscribed to and customer profile data of said recipient.

55. The electronic message modifying system as set forth in claim 42, wherein said modification parameters in said database pertain to user profile properties of said recipient.

56. The electronic message modifying system as set forth in claim 55, wherein said modification parameters in said database pertain to user profile properties of said recipient, comprising at least one modification parameter selected from the group consisting of: parameters associated with a particular messaging account, parameters associated with particular person; parameters associated with particular entity; parameters establishing a unique identity of said recipient; parameters associated with personal information of said recipient, gender of said recipient, age of said recipient, wearing glasses by said recipient, hearing impairment of said recipient, other disabilities of said recipient, marital status of said recipient, hometown of said recipient, language preference of said recipient, preferences specified for the messaging account of said recipient; message box quota and/or current available size at the messaging account of said recipient, last time and device accessed the messaging account of said recipient, information related to devices used to access the messaging account of said recipient; information related to analysis performed by the messaging account manager of the messaging account of said recipient.

57. The electronic message modifying system as set forth in claim 42, wherein said modification parameters in said database provided by external service providers.

58. The electronic message modifying system as set forth in claim 57, wherein said modification parameters in said database provided by external service providers, comprising at least one modification parameter selected from the group consisting of: parameters associated with information services, parameters associated with subscription services, parameters associated with social networks; parameters associated with consumer services of said recipient; parameters associated with message address; parameters associated with credentials of said recipient, parameters related to a unique ID of said service provider; parameters related to logical IP address of said machine associated with said recipient message user agent; parameters related to IMEI address of said machine associated with said recipient message user agent; parameters related to MAC address of said machine associated with said recipient message user agent; browsing and/or usage patterns and/or history associated with said recipient; contact list and/or social graph associated with said recipient; device currently used and/or devices used before by said recipient; advertisement consumed on a particular service; purchase history of said recipient; available credit of said recipient; preferences specified by said recipient.

59. The electronic message modifying system as set forth in claim 42, wherein said modification parameters in said database are provided by an appliance.

60. The electronic message modifying system as set forth in claim 59, wherein said appliance is an inventory system, capable of monitoring an amount and/or condition of goods stored therein.

61. The electronic message modifying system as set forth in claim 42, wherein said sender moiety further comprises at least one message agent selected from the group consisting of: a message transfer agent and message submission agent.

62. The electronic message modifying system as set forth in claim 42, wherein said recipient moiety further comprises at least one message agent selected from the group consisting of: a message transfer agent, message delivery agent and retrieval agent.

63. The electronic message modifying system as set forth in claim 42, wherein said modification is a modification of a first type, performed in accordance with pre-modification parameters prescribed by said message pre-modification agent, upon at least one selected from the group consisting of: receipt of an incoming message by said message transfer agent in said recipient moiety; receipt of an incoming message by said recipient message modification agent; an access and/or retrieval of a message by said message user agent in said recipient moiety.

64. The electronic message modifying system as set forth in claim 42, wherein said modification is a modification of a second type, performed upon at least one selected from the group consisting of: receipt of an incoming message by said message transfer agent in said recipient moiety, and receipt of an incoming message by said recipient message modification agent; wherein said modification of the second type is associated with modification parameters retrieved from said database a retrieval of a first type.

65. The electronic message modifying system as set forth in claim 42, wherein said modification is a modification of a third type performed upon at least one selected from the group consisting of: access to, retrieval by and pushing of an incoming message by said message user agent in said recipient moiety; wherein said modification of the third type is associated with modification parameters retrieved from said database a retrieval of a second type.

66. The electronic message modifying system as set forth in claim 42, wherein said modification is a modification of a fourth type, performed in accordance with modification parameters other than these retrieved from said database.

67. The electronic message modifying system as set forth in claim 42, wherein said modification performed by said at least one message modification agent is a temporal singular modification.

68. The electronic message modifying system as set forth in claim 42, wherein said message user agent is an instant messaging/presence user agent.

69. The electronic message modifying system as set forth in claim 42, wherein said system further comprises an instant messaging/presence server.

70. The electronic message modifying system as set forth in claim 69, wherein said instant messaging/presence server is associated with said transfer message modification agent.

71. The electronic message modifying system as set forth in claim 69, wherein said dynamic update of said modification parameters in said database is performed from said instant messaging/presence server.

72. The electronic message modifying system as set forth in claim 69, wherein said modification parameters are retrieved by said at least one modification agent from at least one source selected from the group consisting of: said database, said instant messaging/presence server said machine associated with said recipient message user agent.

73. The electronic message modifying system as set forth in claim 70, wherein said dynamic update of said modification parameters in said database is performed by pushing into said database updated modification parameters from said instant messaging/presence server.

74. The electronic message modifying system as set forth in claim 70, wherein said modification is a modification of a sixth type comprising modifying said message in accordance with at least one attribute associated with a watcher.

75. The electronic message modifying system as set forth in claim 68, wherein said instant messaging/presence server performs a multiple distribution of singularly modified messages to a plurality of watchers.

76. The electronic message modifying system as set forth in claim 42, wherein said machine associated with said recipient message user agent is associated with a plurality of recipient message user agent appurtenant to different unique identities (UIDs).

77. The electronic message modifying system as set forth in claim 69, wherein said dynamic update of said modification parameters in said database is performed by said database-management-system of said database, which retrieves updated modification parameters from said instant messaging/presence server.

78. The electronic message modifying system as set forth in claim 42, wherein said dynamic update of said modification parameters in said database is performed prompted upon an initiation of a session with said recipient moiety.

79. The electronic message modifying system as set forth in claim 42, wherein said system further comprises an instant messaging and/or presence relay.

80. The electronic message modifying system as set forth in claim 42, wherein said sender moiety and at least one of said recipient moieties are implemented on different platforms, whereas said system comprises at least one gateway, which acts as an instant messaging and/or presence relay, capable of converting a message to a format compatible with the platform of said at least one of said recipient moieties.

81. The electronic message modifying system as set forth in claim 42, wherein said recipient moiety is a plurality of recipient moieties associated with a singular unique identity (UID).

82. The electronic message modifying system as set forth in claim 81, wherein said unique identity (UID) is associated with at least one member selected from the group consisting of: a messaging account, e-mail address, account associated with an individual person, a profile entity associated with an individual person, a username at a specific domain, a username for an account which is an email address.

83. The electronic message modifying system as set forth in claim 81, wherein said recipient moiety is a plurality of recipient moieties associated with a singular unique identity (UID), and wherein said modification is performed in accordance with modification parameters allocated within said database in at least one composite entry, comprising a plurality of sub-entries representing associated with said singular unique identity (UID).

84. The electronic message modifying system as set forth in claim 42, wherein said modification is performed on the IM/PRSN level.

85. The electronic message modifying system as set forth in claim 42, wherein said system is dedicated for modification of presence messaging.

86. The electronic message modifying system as set forth in claim 42, wherein at least one of said message modification agents stores and manages retrieved records of said modification parameters in a local manner.

* * * * *